(12) United States Patent
Hiratsuka (10) Patent No.: US 11,283,059 B2
(45) Date of Patent: *Mar. 22, 2022

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Corporation, Kadoma (JP)

(72) Inventor: Hidekazu Hiratsuka, Osaka (JP)

(73) Assignee: PANASONIC CORPORATION, Kadoma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/486,911

(22) PCT Filed: Feb. 1, 2018

(86) PCT No.: PCT/JP2018/003377
§ 371 (c)(1),
(2) Date: Aug. 19, 2019

(87) PCT Pub. No.: WO2018/155121
PCT Pub. Date: Aug. 30, 2018

(65) Prior Publication Data
US 2020/0235376 A1    Jul. 23, 2020

(30) Foreign Application Priority Data
Feb. 21, 2017 (JP) .............................. JP2017-030438

(51) Int. Cl.
*H01M 4/131* (2010.01)
*C01G 53/04* (2006.01)
(Continued)

(52) U.S. Cl.
CPC ............ *H01M 4/131* (2013.01); *C01G 53/04* (2013.01); *H01M 4/1391* (2013.01);
(Continued)

(58) Field of Classification Search
CPC .... H01M 4/131; H01M 4/1391; H01M 4/485; H01M 4/525; H01M 2004/021;
(Continued)

(56) References Cited

U.S. PATENT DOCUMENTS

2002/0122983 A1    9/2002  Nakai et al.
2009/0104530 A1*   4/2009  Shizuka ................. C01G 53/50
                                                         429/223
(Continued)

FOREIGN PATENT DOCUMENTS

CN    102044672 A    5/2011
CN    103270628 A    8/2013
(Continued)

OTHER PUBLICATIONS

EPO machine translation of WO 2015115088, originally published to Masahara Koh on Aug. 6, 2015 (Year: 2015).*
(Continued)

*Primary Examiner* — Cynthia H Kelly
*Assistant Examiner* — Niara Trant
(74) *Attorney, Agent, or Firm* — Westerman, Hattori, Daniels & Adrian, LLP (57) ABSTRACT

A positive electrode active material for nonaqueous electrolyte secondary batteries includes secondary particles of lithium transition metal oxide including aggregates of primary particles of the oxide. The primary particles have an average particle size of not less than 1 μm, and the secondary particles have a void content of more than 30%.

6 Claims, 2 Drawing Sheets

(51) Int. Cl.
  *H01M 4/1391*   (2010.01)
  *H01M 4/485*    (2010.01)
  *H01M 4/505*    (2010.01)
  *H01M 4/525*    (2010.01)
  *H01M 10/0525*  (2010.01)
  *H01M 4/02*     (2006.01)

(52) U.S. Cl.
  CPC ........... *H01M 4/485* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
  CPC ..... H01M 2004/028; H01M 4/02–485; H01M 10/05–10/0525; C01G 53/04
  USPC .......................................................... 429/218
  See application file for complete search history.

(56) References Cited

U.S. PATENT DOCUMENTS

| | | | |
|---|---|---|---|
| 2009/0208840 A1 | 8/2009 | Ogasawara et al. | |
| 2009/0314985 A1 | 12/2009 | Malcus et al. | |
| 2013/0260245 A1* | 10/2013 | Kitagawa | H01M 4/5825 429/220 |
| 2018/0254511 A1* | 9/2018 | Park | C01G 53/50 |
| 2019/0103605 A1* | 4/2019 | Saitou | H01M 4/134 |

FOREIGN PATENT DOCUMENTS

| | | |
|---|---|---|
| CN | 105789621 A | 7/2016 |
| JP | 2001-85006 A | 3/2001 |
| JP | 2002-198101 A | 7/2002 |
| JP | 2003-017056 A | 1/2003 |
| JP | 2005-158401 A | 6/2005 |
| JP | 2007-258187 A | 10/2007 |
| JP | 2007-280911 A | 10/2007 |
| JP | 2009-205974 A | 9/2009 |
| JP | 2010-505732 A | 2/2010 |
| JP | 2010-047466 A | 3/2010 |
| JP | 2013-051104 A | 3/2013 |
| JP | 2015-191848 A | 11/2015 |
| JP | 2016-012500 A | 1/2016 |
| WO | 2015/115088 A1 | 8/2015 |

OTHER PUBLICATIONS

International Search Report dated May 1, 2018, issued in counterpart application No. PCT/JP2018/003377, with English translation. (4 pages).

English Translation of Chinese Search Report dated Oct. 9, 2021, issued in counterpart CN application No. 201880007778.1. (3 pages).

\* cited by examiner

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

TECHNICAL FIELD

The present disclosure relates to a positive electrode active material for nonaqueous electrolyte secondary batteries, and to a nonaqueous electrolyte secondary battery.

BACKGROUND ART

Nonaqueous electrolyte secondary batteries are secondary batteries with high output and high energy density which are widely used in recent years. Nonaqueous electrolyte secondary batteries have a positive electrode, a negative electrode and a nonaqueous electrolyte, and are charged and discharged by migration of lithium ions between the positive electrode and the negative electrode.

For example, Patent Literature 1 discloses a lithium transition metal oxide as a positive electrode active material for nonaqueous electrolyte secondary batteries. This oxide has 30% or less void content in secondary particles formed of aggregated primary particles.

CITATION LIST

Patent Literature

PTL 1: Japanese Published Unexamined Patent Application No. 2001-85006

SUMMARY OF INVENTION

Secondary particles of lithium transition metal oxide having a void content of 30% or less, as is the case in Patent Literature 1, are less permeable to an electrolytic solution (a nonaqueous electrolyte) and make it difficult to increase the output. That is, the void content in secondary particles needs to be high in order to attain an enhanced output. If, however, secondary particles are produced so as to have a higher void content than that in Patent Literature 1, primary particles become smaller and brittle to cause a decrease in charge discharge cycle characteristics.

The present disclosure has been made in light of the problem in the art discussed above. It is therefore an object of the present disclosure to provide a positive electrode active material for nonaqueous electrolyte secondary batteries which allows the output of nonaqueous electrolyte secondary batteries to be increased while reducing the deteriorations in charge discharge cycle characteristics.

An aspect of the present disclosure resides in a positive electrode active material for nonaqueous electrolyte secondary batteries which includes secondary particles of lithium transition metal oxide including aggregates of primary particles of the oxide, the primary particles having an average particle size of not less than 1 m, the secondary particles having a void content of more than 30%.

A nonaqueous electrolyte secondary battery according to an aspect of the present disclosure includes a positive electrode, a negative electrode and a nonaqueous electrolyte, the positive electrode including the positive electrode active material for nonaqueous electrolyte secondary batteries described above.

According to one aspect of the present disclosure, it is possible to increase the capacity of a nonaqueous electrolyte secondary battery while reducing the deteriorations in charge discharge cycle characteristics.

DESCRIPTION OF EMBODIMENTS

Underlying Knowledge Forming Basis of Present Disclosure

The void content in secondary particles of lithium transition metal oxide may be controlled at the time of synthesis of the lithium transition metal oxide. When a lithium transition metal oxide is synthesized by the conventional method so as to attain an increased void content in secondary particles, primary particles are caused to be small and brittle. A lithium transition metal oxide is swollen and shrunk during charging and discharging of a nonaqueous electrolyte secondary battery. Small primary particles are broken during this swelling and shrinkage, and consequently charge discharge cycle characteristics are deteriorated at times.

The present inventors carried out extensive studies on this problem and have developed a method capable of synthesizing a lithium transition metal oxide with an increased void content in secondary particles without suffering the size reduction of primary particles of the lithium transition metal oxide. The present inventors have then reached a positive electrode active material for nonaqueous electrolyte secondary batteries described below which forms an aspect of the present disclosure.

A positive electrode active material for nonaqueous electrolyte secondary batteries according to an aspect of the present disclosure includes secondary particles of lithium transition metal oxide formed of aggregates of primary particles of the oxide. The primary particles have an average particle size of not less than 1 μm, and the secondary particles have a void content of more than 30%. In the positive electrode active material for nonaqueous electrolyte secondary batteries according to one aspect of the present disclosure, the secondary particles have as large a void content as more than 30% and thus exhibit enhanced permeability to an electrolytic solution into the inside of the secondary particles, allowing the output of nonaqueous electrolyte secondary batteries to be increased. Further, the primary particles have a large average particle size of 1 μm or more and are high in strength. Thus, the primary particles are resistant to breakage even when the lithium transition metal oxide is swollen and shrunk by charging and discharging of batteries, and the deteriorations in charge discharge cycle characteristics of nonaqueous electrolyte secondary batteries can be controlled. The method for synthesizing a lithium transition metal oxide having an average particle size of primary particles of not less than 1 μm and a void content in secondary particles of more than 30% will be described later.

Hereinbelow, some embodiments will be described in detail with reference to drawings. The positive electrode active materials for nonaqueous electrolyte secondary batteries, and the nonaqueous electrolyte secondary batteries of the present disclosure are not limited to those embodiments described hereinbelow. The drawings used in the description of embodiments are only illustrative.

Figure 1:
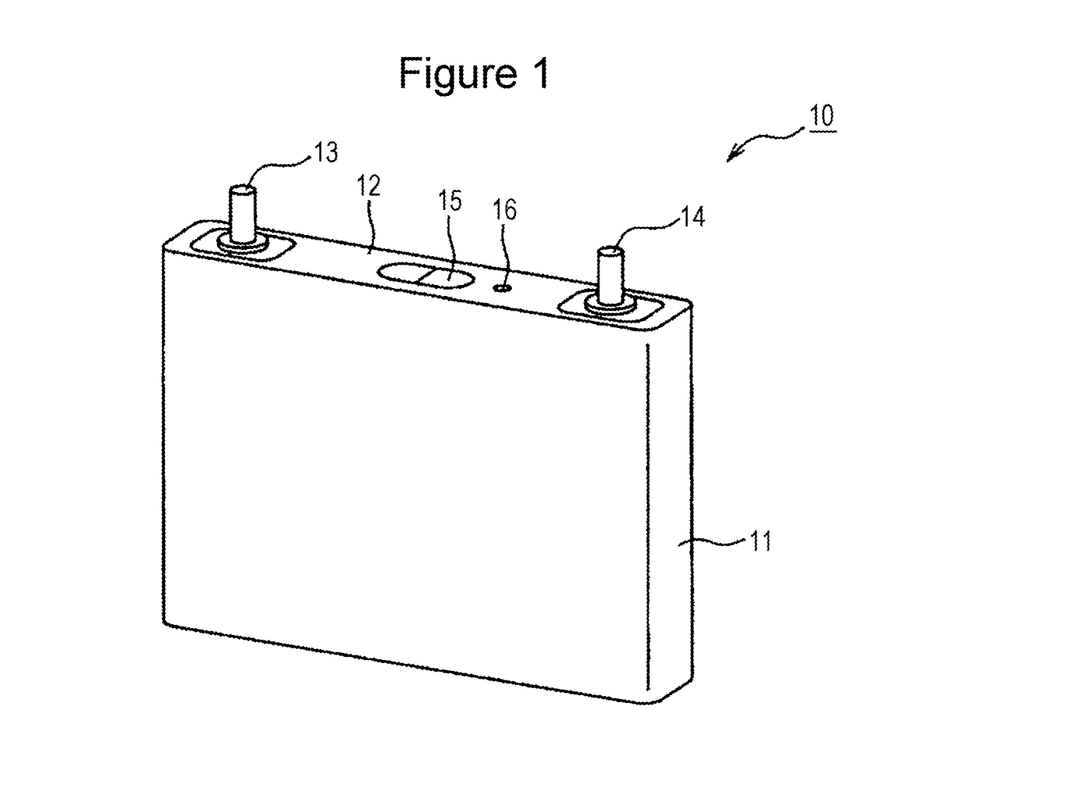
FIG. 1 is a perspective view of a nonaqueous electrolyte secondary battery according to an embodiment.

FIG. 1 is a perspective view illustrating the appearance of a nonaqueous electrolyte secondary battery according to an embodiment. For example, the nonaqueous electrolyte secondary battery 10 illustrated in FIG. 1 includes a bottomed prismatic tubular exterior case 11 having an opening on the top, and a sealing plate 12 covering the opening of the exterior case 11. While the nonaqueous electrolyte secondary battery 10 illustrated in FIG. 1 is a prismatic battery, the shape of the battery is not limited thereto and may be other shapes such as, for example, cylindrical shapes, coin shapes, button shapes and laminate shapes.

The exterior case 11 accommodates an electrode assembly and a nonaqueous electrolyte. The electrode assembly may be, for example, a wound electrode assembly in which a positive electrode and a negative electrode are wound via a separator, or a layered electrode assembly in which a positive electrode and a negative electrode are stacked via a separator.

The sealing plate 12 is provided with a positive electrode external terminal 13, a negative electrode external terminal 14, a gas vent valve 15, and an injection section 16. The positive electrode external terminal 13 and the negative electrode external terminal 14 are fitted to the sealing plate 12 while being electrically insulated from the sealing plate 12 by, for example, an insulating gasket. The positive electrode external terminal 13 is connected to the positive electrode inside the exterior case 11, and the negative electrode external terminal 14 is connected to the negative electrode inside the exterior case 11. Incidentally, the sealing plate 12 may have a negative electrode external terminal alone as its external terminal, and the exterior case 11 may serve as a positive electrode external terminal. The injection section 16 is generally composed of an injection hole through which a nonaqueous electrolyte (an electrolytic solution) is poured, and a plug which closes the injection hole.

Hereinbelow, the constituents of the nonaqueous electrolyte secondary battery 10 will be described in detail.

[Positive Electrodes]

For example, the positive electrode is composed of a positive electrode current collector such as a metal foil, and a positive electrode mixture layer disposed on the positive electrode current collector. The positive electrode current collector may be, for example, a foil of a metal which is stable at positive electrode potentials, such as aluminum, or a film having such a metal as a skin layer.

The positive electrode mixture layer includes a positive electrode active material. In addition to the positive electrode active material, the positive electrode mixture layer preferably includes a conductive agent and a binder. For example, the thickness of the positive electrode mixture layer is not less than 10 μm.

For example, the positive electrode may be fabricated by preparing a positive electrode mixture slurry including a positive electrode active material, a conductive agent, a binder, etc., applying the positive electrode mixture slurry onto a positive electrode current collector, drying the wet film to form a positive electrode mixture layer, and pressing the positive electrode mixture layer.

Figure 2:
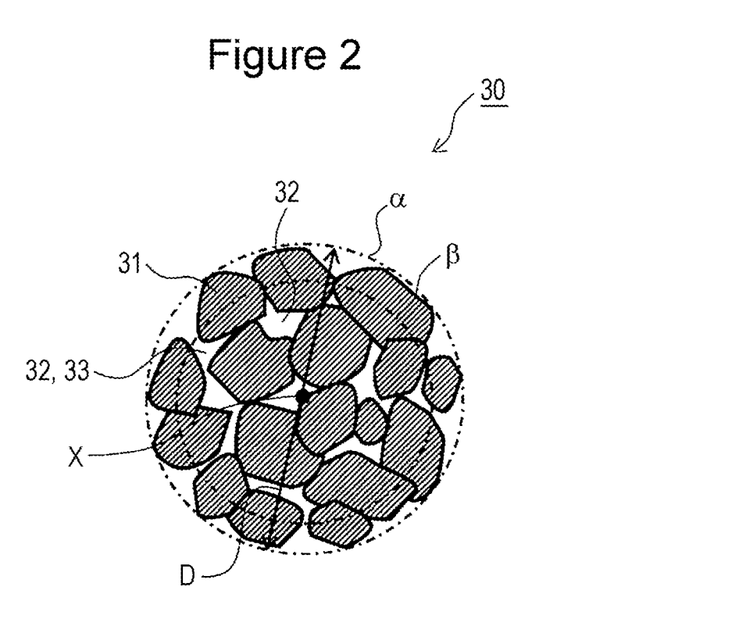
FIG. 2 is a schematic enlarged sectional view of a particle of a positive electrode active material.

FIG. 2 is a schematic enlarged sectional view of a particle of the positive electrode active material. As illustrated in FIG. 2, the positive electrode active material includes a secondary particle 30 which is an aggregate of primary particles 31 of lithium transition metal oxide. The secondary particle 30 of lithium transition metal oxide has voids 32 defined by the primary particles 31 (hereinafter, written as the voids 32 within the secondary particle).

The lithium transition metal oxide may be a known such oxide, for example, an oxide which contains at least nickel (Ni), cobalt (Co) and manganese (Mn) and has a Ni proportion of not less than 30 mol % relative to the total number of moles of metal elements except lithium (Li). The lithium transition metal oxide may be easily controlled in void content in the secondary particles 30 when it contains Ni, Co and Mn. The high Ni content offers an enhanced capacity of the positive electrode.

For example, the lithium transition metal oxide is preferably an oxide represented by the compositional formula $Li_aNi_xM_{(1-x)}O_2$ ($0.95 \le a \le 1.2$, $0.3 \le x < 1.0$, and M is a metal element other than Li and Ni). The Ni content may be 50 mol % or above, and may be 50 mol % to 80 mol %. The metal elements other than Li and Ni which are contained in the lithium transition metal oxide are preferably Co and Mn as described above. The oxide may further contain, for example, at least one selected from tungsten (W), niobium (Nb), molybdenum (Mo), phosphorus (P) and sulfur (S). The oxide may further contain at least one selected from magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), lead (Pb) and bismuth (Bi).

The void content in the secondary particles 30 of lithium transition metal oxide is more than 30%. In particular, to enhance the permeability to an electrolytic solution and to further enhance the output characteristics of nonaqueous electrolyte secondary batteries, the void content in the secondary particles 30 is preferably not less than 40%. In consideration of the packing density in the positive electrode mixture layer, the void content is desirably in the range of 40% to 60%. In the present specification, the void content in the secondary particles 30 of lithium transition metal oxide is a two-dimensional value determined from the ratio of the area of the voids 32 within the secondary particles to the sectional area of the secondary particles 30 of lithium transition metal oxide.

The void content in the secondary particles 30 of lithium transition metal oxide may be determined by analyzing a sectional SEM image of the particles obtained with a scanning electron microscope (SEM). For example, the positive electrode may be buried into a resin and processed with Cross section polisher (CP) or the like to expose a cross section of the positive electrode mixture layer, which is then photographed by SEM. Alternatively, a powder of the lithium transition metal oxide may be buried into a resin and processed with Cross section polisher (CP) or the like to expose cross sections of the lithium transition metal oxide particles, which are then photographed by SEM.

With use of an analysis software such as Image-Pro PLUS, outlines are drawn along the surface of the respective secondary particles 30 in the sectional SEM image, and the total area of the regions enclosed by the outlines is obtained as the sectional area of the secondary particles 30. Separately, the total area of black portions within the regions enclosed by the outlines is calculated as the area of voids 32 within the secondary particles. The ratio of the area of voids 32 within the secondary particles to the sectional area of the secondary particles 30 is calculated as the void content in the secondary particles 30 of lithium transition metal oxide.

The average particle size of the primary particles 31 forming the secondary particles 30 of lithium transition metal oxide is not less than 1 μm. To attain a further reduction in the deteriorations in charge discharge cycle characteristics of nonaqueous electrolyte secondary batteries, in particular, the average particle size is preferably, for example, not less than 1.5 μm, and more preferably in the range of 1.5 μm to 5 μm. For example, the primary particles 31 are in the form of ellipse, rod or the like. The aspect ratio, which is the ratio of longer diameter to shorter diameter (longer diameter/shorter diameter), of the primary particles 31 is preferably 2 or more. Preferably, of part of the primary particles 31 forming the secondary particles 30, for example, 50% or more of the primary particles have an aspect ratio of 2 or more. The average particle size of the primary particles 31 is calculated based on the longer diameters. The shorter diameters of the primary particles 31 are, for example, 0.2 μm to 1 μm.

Specifically, the average particle size of the primary particles may be measured as follows.

(1) Ten primary particles are selected randomly on a sectional SEM image obtained as described above.

(2) Grain boundaries of the selected ten primary particles are observed to identify the profiles of the primary particles.

(3) The respective longer diameters (the longest diameters) of the ten primary particles are measured, and the average thereof is obtained as the average particle size of the primary particles.

For example, the average particle size of the secondary particles 30 of lithium transition metal oxide is 4 μm to 30 μm, and preferably 7 μm to 20 μm. The average particle size of the secondary particles 30 of lithium transition metal oxide is the median diameter (on volume basis) measured by a laser diffraction method, and may be determined with, for example, a laser diffraction scattering grain size distribution analyzer manufactured by HORIBA, Ltd.

As illustrated in FIG. 2, it is preferable that the voids 32 within the secondary particles of lithium transition metal oxide include a long void 33 which is continuous from the surface of the secondary particle 30 toward the inside of the particle over a length of more than ⅙ of the particle diameter D. Such a long void 33 allows an electrolytic solution to reach quickly the inside of the secondary particle 30 of lithium transition metal oxide. Here, the particle diameter D is, as illustrated in FIG. 2, the diameter of a circumscribed circle α on the secondary particle 30 in the cross section of the secondary particle 30. In the present specification, the long void 33 is defined as extending from the circumscribed circle α (the particle surface) toward the center X of the circumscribed circle α over a length of more than ⅙ of the particle diameter D. In other words, the long voids 33 exclude closed voids which are not open (do not have an entrance) on the particle surface, and voids which do not extend beyond ⅙ of the particle diameter D.

The long voids 33 may extend substantially straight or may zigzag from the particle surface toward the center X. The long voids 33 may be branched. A single continuous long void 33 may have a plurality of entrances and/or a plurality of blocked ends. The long voids 33 which zigzag may be longer than the particle diameter D.

The entrances of the long voids 33 are preferably distributed uniformly over the entire particle surface of the secondary particles 30 of the positive electrode active material. The long voids 33 may be continuous to the inside of the particles over a length more than ⅖ (⅓) or ⅗ (½) of the particle diameter D from the particle surface toward the center X. FIG. 2 illustrates a circle β which is concentric with the circumscribed circle α and has a diameter that is ⅚ of the diameter D. When the secondary particles 30 of lithium transition metal oxide are substantially perfect circles in cross section, it is preferable that the long voids 33 be continuous from the particle surface to the inside of the particles beyond the circle β.

For example, the proportion of the long voids 33 (hereinafter, also written as the "long void ratio") relative to the voids 32 within the secondary particles is preferably not less than 20%, more preferably not less than 30%, and still more preferably not less than 50%. Here, the proportion of the long voids 33 relative to the voids 32 within the secondary particles is calculated from the equation: (Area of long voids 33/Area of voids 32)×100. For example, the average of the long void ratios of secondary particles 30 (N=100) with an average particle size of 7 μm to 15 μm is preferably in the range of 20% to 80%, more preferably in the range of 30% to 70%, and still more preferably in the range of 30% to 60%.

The voids 32 within the secondary particles may include a portion of the conductive agent present in the positive electrode mixture layer. For example, such a portion of the conductive agent finds its way into the voids 32 which are open on the surface of the secondary particles 30 during the preparation of the positive electrode mixture slurry or during the formation of the positive electrode mixture layer. A portion of the conductive agent may be present within the long voids 33 and may be incorporated to the inside of the particles over a length more than ⅙ of the particle diameter D. For example, the conductive agent present inside the voids forms good conductive paths within the positive electrode mixture layer and sometimes offers further enhancements in output characteristics.

The pore size diameter distribution of the secondary particles 30 preferably has a peak in the range of 0.3 to 1.0 μm on the distribution curve. The pore size diameter distribution of the secondary particles 30 is the common logarithmic distribution of the pore size diameters (the diameters of the voids) of the secondary particles 30 of lithium transition metal oxide measured by a mercury intrusion method. For example, this pore size diameter distribution may be represented by a graph plotting the pore size diameters (in common logarithm) on the abscissa and the log differential intrusions on the ordinate. The pore size diameter distribution may be measured with a mercury porosimeter (for example, product name: Porosimeter model 9810 manufactured by Shimadzu Corporation). When the pore size diameter distribution of the secondary particles 30 of lithium transition metal oxide has a peak in the range of 0.3 to 1.0 μm, the permeability to an electrolytic solution to the inside of the secondary particles 30 may be enhanced, and the output characteristics of nonaqueous electrolyte secondary batteries may be further enhanced.

The compressive fracture strength of the secondary particles 30 is preferably in the range of 200 to 500 MPa, and more preferably in the range of 250 to 350 MPa. When the compressive fracture strength of the secondary particles 30 is in the above range, the size reduction of the secondary particles 30 associated with charging and discharging is small as compared to when the compressive fracture strength is outside the above range, and consequently the deteriorations in the charge discharge cycle characteristics of nonaqueous electrolyte secondary batteries are suppressed more effectively. The compressive fracture strength of the secondary particles 30 indicates the compressive fracture strength (St) of the individual secondary particle, and is calculated using the equation: $St = 2.8P/\pi d^2$ (wherein p: load on particle, d: particle diameter) described in Journal of the Mining and Metallurgical Institute of Japan, Vol. 81, No. 932, December Issue, 1965, pp. 1024-1030.

It is preferable that the crystallite size of lithium transition metal oxide be not less than 200 nm and the crystal distortion of lithium transition metal oxide be less than 0.2%. The lithium transition metal oxide satisfying these ranges of crystallite size and crystal distortion has a stronger crystal structure than when the lithium transition metal oxide fails to satisfy these ranges, and thus makes it possible to, for example, increase the capacity of nonaqueous electrolyte secondary batteries or further reduce the deteriorations in charge discharge cycle characteristics.

The crystallite size and crystal distortion of the lithium transition metal oxide may be determined by obtaining a powder X-ray diffraction pattern using a powder X-ray diffractometer (product name: "D8 ADVANCE" manufactured by Bruker AXS), analyzing the powder X-ray diffraction pattern by a Pawley method using FP (fundamental parameter) as the profile function with use of Rietveld analysis software TOPAS (manufactured by Bruker AXS), and performing calculations based on the half-value width of the Lorentz function component.

The X-ray diffractometry is performed under conditions where the detector is PSD (LYNX EYE), the tube is CuK$\alpha$1 (wavelength: 1.5418 Å), the X-ray output is 40 kV×40 mA, the slit width is 0.3°, the step width is 0.03°, the measurement time per step is 1 sec, and the measurement range is from 10 to 100°.

The lithium transition metal oxide may be obtained by, for example, mixing a transition metal precursor with a lithium compound, and calcining the mixture. For example, the transition metal precursor is a transition metal hydroxide obtained by dropping an alkaline solution such as sodium hydroxide to a solution containing one or a plurality of kinds of transition metal salts while performing stirring so as to control the pH to the alkaline side (for example, 8.5 to 11.5) and to form a precipitate (a coprecipitate). The void content in the secondary particles of lithium transition metal oxide, the particle size of the primary particles, and the crystallite size and crystal distortion of the lithium transition metal oxide may be controlled mainly by controlling the rate of stirring of the solution of the transition metal salt(s) and the temperature at which the mixture of the transition metal precursor and the lithium compound is calcined.

In the present embodiment, the rate of stirring of the solution of the transition metal salt(s) is lower than the conventional stirring rate (which is, for example, 300 rpm or more), and is preferably in the range of, for example, 150 to 250 rpm, and more preferably in the range of 170 to 230 rpm. The transition metal precursor obtained using such a stirring rate has a lower tap density than when the transition metal precursor is obtained with the conventional stirring rate. For example, the tap density of the transition metal precursor is not more than 1.5 g/cm$^3$. By virtue of the transition metal precursor having such a low tap density, the transition metal oxide obtained therefrom can attain an increased void content in secondary particles.

The mixture of the transition metal precursor having a low tap density with the lithium compound is calcined at above a usual calcination temperature (which is, for example, less than 950° C.), and is preferably calcined at a temperature in the range of, for example, 970° C. to 1070° C., and more preferably in the range of 990° C. to 1050° C. Such a high calcination temperature ensures that the primary particles will have an increased average particle size and the lithium transition metal oxide will have a larger crystallite size. The transition metal precursor with low tap density contains a relatively large amount of oxygen trapped inside the particles, and therefore the transition metal oxide obtained by calcination at the above high temperature has less oxygen vacancies and attains a small crystal distortion.

If the stirring rate is conventional (for example, 300 rpm), the transition metal precursor will have an increased tap density as compared to the present embodiment and consequently the void content in the secondary particles of the transition metal oxide obtained therefrom will be as low as 30% or less. Further, the transition metal precursor with a high tap density contains less oxygen inside the particles and, when calcined at such a high temperature as used in the present embodiment, will give a lithium transition metal oxide which contains many oxygen vacancies and will not attain a crystal distortion of less than 0.2. Even if a transition metal precursor with a low tap density is obtained by using a lower stirring rate than the conventional level as in the present embodiment, the calcination at the above-described usual temperature will afford primary particles with an average particle size of less than 1 μm and will not attain a crystallite size of less than 200 nm.

In the present embodiment, the content of the lithium transition metal oxide in the positive electrode active material is, for example, preferably not less than 90 mass %, and may be substantially 100 mass %. The positive electrode active material may include a lithium transition metal oxide having an average particle size of primary particles and a void content in secondary particles outside the aforementioned ranges while still achieving the advantageous effects of the present invention.

Examples of the conductive agents include carbon materials such as carbon black, acetylene black, Ketjen black and graphite. The conductive agents may be used singly, or two or more may be used in combination.

Examples of the binders include fluororesins such as polytetrafluoroethylene (PTFE) and polyvinylidene fluoride (PVdF), polyacrylonitriles (PAN), polyimides, acrylic resins and polyolefins. These resins may be used in combination with, for example, carboxymethylcellulose (CMC) or a salt thereof, or polyethylene oxide (PEO). The binders may be used singly, or two or more may be used in combination.

[Negative Electrodes]

For example, the negative electrode is composed of a negative electrode current collector made of a metal foil or the like, and a negative electrode mixture layer disposed on the current collector. The negative electrode current collector may be, for example, a foil of a metal that is stable at negative electrode potentials, such as copper, or a film having such a metal as a skin layer. The negative electrode mixture layer includes a negative electrode active material and a binder. For example, the negative electrode may be fabricated by preparing a negative electrode mixture slurry including a negative electrode active material, a binder, etc., applying the negative electrode mixture slurry onto a negative electrode current collector, drying the wet film to form a negative electrode mixture layer, and pressing the negative electrode mixture layer.

The negative electrode active material is not particularly limited as long as it can reversibly store and release lithium ions. Examples thereof include carbon materials such as natural graphite and artificial graphite, metals which can be alloyed with lithium such as silicon (Si) and tin (Sn), and alloys and composite oxides containing such metals as Si and Sn. The negative electrode active materials may be used singly, or two or more may be used in combination.

Examples of the binders include fluororesins, PAN, polyimides, acrylic resins and polyolefins, similarly to the case of the positive electrode. When the mixture slurry is prepared using an aqueous solvent, it is preferable to use, for example, CMC or a salt thereof, styrene-butadiene rubber (SBR), polyacrylic acid (PAA) or a salt thereof, or polyvinyl alcohol (PVA).

[Separators]

The separator may be a porous sheet having ion permeability and insulating properties. Specific examples of the porous sheets include microporous thin films, woven fabrics and nonwoven fabrics. For example, the separator is composed of a polyolefin such as polyethylene or polypropylene, or a cellulose. The separator may be a stack having a cellulose fiber layer and a thermoplastic resin fiber layer such as of polyolefin. The separator may be a multilayer separator including a polyethylene layer and a polypropylene layer, and may have a surface layer including an aramid resin or a surface layer containing an inorganic filler.

[Nonaqueous Electrolytes]

The nonaqueous electrolyte includes a nonaqueous solvent and a solute (an electrolyte salt) dissolved in the nonaqueous solvent. Examples of the nonaqueous solvents include esters, ethers, nitriles, amides such as dimethylformamide, isocyanates such as hexamethylene diisocyanate, and mixtures of two or more kinds of these solvents. The nonaqueous solvent may be a halogenated solvent resulting from the substitution of the above solvent with a halogen atom such as fluorine in place of at least part of hydrogen.

Examples of the esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methyl propyl carbonate, ethyl propyl carbonate and methyl isopropyl carbonate, cyclic carboxylate esters such as γ-butyrolactone and γ-valerolactone, and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Examples of the nitriles include acetonitrile, propionitrile, butyronitrile, valeronitrile, n-heptanitrile, succinonitrile, glutaronitrile, adiponitrile, pimelonitrile, 1,2,3-propanetricarbonitrile, and 1,3,5-pentanetricarbonitrile.

Examples of the halogenated solvents include fluorinated cyclic carbonate esters such as fluoroethylene carbonate (FEC), fluorinated chain carbonate esters, and fluorinated chain carboxylate esters such as fluoromethyl propionate (FMP).

Examples of the electrolyte salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, and n is 1 or 2), $LiB_{10}Cl_{10}$, LiCl, LiBr, LiI, chloroborane lithium, lower aliphatic carboxylic acid lithiums, borate salts such as $Li_2B_4O_7$ and $Li(B(C_2O_4)F_2)$, and imide salts such as $LiN(SO_2CF_3)_2$ and $LiN(C_1F_{2l+1}SO_2)$ $(C_mF_{2m+1}SO_2)$ {l and m are integers of 0 or greater}. The electrolyte salts may be used singly, or a plurality thereof may be used as a mixture. The concentration of the electrolyte salt is, for example, 0.8 to 1.8 mol per L of the nonaqueous solvent.

EXAMPLES

Hereinbelow, the present disclosure will be further described based on EXAMPLES. However, it should be construed that the scope of the present disclosure is not limited to such EXAMPLES.

Example 1

[Preparation of Lithium Transition Metal Oxide]

1 M Aqueous nickel nitrate solution, 1 M aqueous cobalt nitrate solution and 1 M aqueous manganese nitrate solution were mixed together with Ni:Co:Mn molar ratio of 33:33:33 to give an aqueous mixture solution. While stirring this aqueous mixture solution at a stirring rate of 200 rpm, 1 M aqueous sodium hydroxide solution was added dropwise until the pH reached 8.5, and thereby a transition metal precursor represented by the compositional formula $Ni_{0.33}Co_{0.33}Mn_{0.33}(OH)_2$ was coprecipitated. The tap density of the transition metal precursor was 1.5 g/cm$^3$. The transition metal precursor and LiOH was mixed to each other, and the mixture was calcined under a stream of oxygen at 1025° C. for 20 hours. Thus, a lithium transition metal oxide represented by the compositional formula $Li_{1.05}Ni_{0.33}Co_{0.33}Mn_{0.33}O_2$ was synthesized.

The lithium transition metal oxide obtained above had a void content in secondary particles of 32%, an average particle size of primary particles of 2 µm, a crystallite size of 280 nm, a crystal distortion of 0.13%, and a compressive fracture strength of secondary particles of 350 MPa. The methods for measuring these properties are as described hereinabove, and the same applies to EXAMPLES 2 and 3 and COMPARATIVE EXAMPLES 1 and 2 described later.

Figure 3:
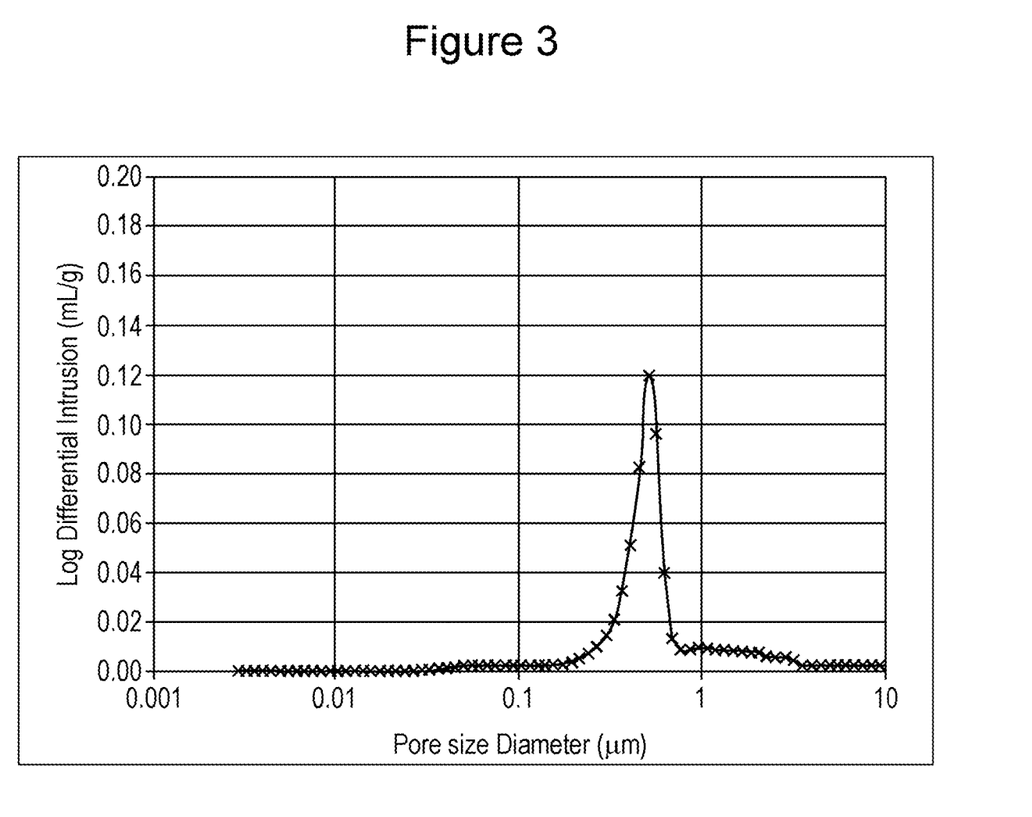
FIG. 3 is a diagram illustrating the pore size diameter distribution of secondary particles of lithium transition metal oxide of EXAMPLE 1.

FIG. 3 shows the pore size diameter distribution of the secondary particles of the lithium transition metal oxide of EXAMPLE 1. The method for measuring the pore size diameter distribution is as described hereinabove, and the same applies to EXAMPLES 2 and 3 and COMPARATIVE EXAMPLES 1 and 2 described later. As illustrated in FIG. 3, the pore size diameter distribution of the secondary particles of the lithium transition metal oxide of EXAMPLE 1 had a peak at 0.5 µm on the distribution curve.

[Fabrication of Positive Electrode]

The lithium transition metal oxide described above was used as a positive electrode active material. A positive electrode mixture slurry was prepared by mixing 95.8 mass % of the positive electrode active material, 3 mass % of carbon powder and 1.2 mass % of polyvinylidene fluoride powder, and adding an appropriate amount of N-methyl-2-pyrrolidone (NMP) The slurry was applied to both sides of an aluminum foil as a current collector by a doctor blade coating method. The wet films were dried and rolled with a press roller at a pressure of 500 MPa. Thus, a positive electrode was fabricated which had positive electrode mixture layers on both sides of the positive electrode current collector. The current collector was free from the mixture layers in the longitudinal central portion thereof, and a positive electrode tab was attached to that portion. The thickness of the positive electrode mixture layer was about 140 μm, and the total thickness of the mixture layers on both sides of the current collector was about 300 μm.

[Fabrication of Negative Electrode]

A slurry was prepared by mixing 98.2 mass % of graphite, 0.7 mass % of styrene-butadiene rubber and 1.1 mass % of sodium carboxymethylcellulose, and mixing the resultant mixture with water. The slurry was applied to both sides of a copper foil as a current collector by a doctor blade coating method. The wet films were dried and rolled with a press roller. Thus, a negative electrode was fabricated which had negative electrode mixture layers on both sides of the negative electrode current collector. The current collector was free from the mixture layers in both longitudinal end portions, and negative electrode tabs were attached to those portions. The thickness of the negative electrode mixture layer was about 120 μm, and the total thickness of the mixture layers on both sides of the current collector was about 250 μm.

[Preparation of Nonaqueous Electrolytic Solution]

$LiPF_6$ was dissolved with a concentration of 1.6 mol/L into a nonaqueous solvent including equal volumes of ethylene carbonate (EC) and diethyl carbonate (DEC). A nonaqueous electrolytic solution was thus obtained.

[Fabrication of Nonaqueous Electrolyte Secondary Battery]

A nonaqueous electrolyte secondary battery was fabricated in the following manner using the positive electrode, the negative electrode, the nonaqueous electrolytic solution and a separator.

(1) The positive electrode and the negative electrode were wound together via a separator to form a wound electrode assembly.

(2) The wound electrode assembly and insulating sheets arranged on and below the electrode assembly were placed into a cylindrical exterior case 18 mm in diameter and 65 mm in height.

(3) The negative electrode current collector tabs were welded to the inner bottom surface of the exterior case, and the positive electrode current collector tab was welded to the bottom of a seal body.

(4) The nonaqueous electrolytic solution was poured through the opening in the exterior case, and the exterior case was tightly closed with the seal body.

Example 2

A lithium transition metal oxide was synthesized in the same manner as in EXAMPLE 1, except that the calcination temperature was changed to 1000° C. The lithium transition metal oxide had a void content in secondary particles of 40%, an average particle size of primary particles of 1.8 μm, a crystallite size of 250 nm, a crystal distortion of 0.12%, and a compressive fracture strength of secondary particles of 300 MPa. The pore size diameter distribution of the secondary particles of the lithium transition metal oxide had a peak at 0.6 μm on the distribution curve.

A nonaqueous electrolyte secondary battery was fabricated in the same manner as in EXAMPLE 1, except that the above lithium transition metal oxide was used as the positive electrode active material of EXAMPLE 2.

Example 3

A lithium transition metal oxide was synthesized in the same manner as in EXAMPLE 1, except that the calcination temperature was changed to 970° C. The lithium transition metal oxide had a void content in secondary particles of 50%, an average particle size of primary particles of 1.5 μm, a crystallite size of 200 nm, a crystal distortion of 0.11%, and a compressive fracture strength of secondary particles of 250 MPa. The pore size diameter distribution of the secondary particles of the lithium transition metal oxide had a peak at 0.7 μm on the distribution curve.

A nonaqueous electrolyte secondary battery was fabricated in the same manner as in EXAMPLE 1, except that the above lithium transition metal oxide was used as the positive electrode active material of EXAMPLE 3.

Comparative Example 1

A lithium transition metal oxide was synthesized in the same manner as in EXAMPLE 1, except that the tap density of the transition metal precursor was changed to 2.0 g/cm³.

The lithium transition metal oxide had a void content in secondary particles of 5%, an average particle size of primary particles of 0.5 μm, a crystallite size of 180 nm, a crystal distortion of 0.2%, and a compressive fracture strength of secondary particles of 120 MPa. The pore size diameter distribution of the secondary particles of the lithium transition metal oxide had a peak at 0.1 μm on the distribution curve.

A nonaqueous electrolyte secondary battery was fabricated in the same manner as in EXAMPLE 1, except that the above lithium transition metal oxide was used as the positive electrode active material of COMPARATIVE EXAMPLE 1.

Comparative Example 2

A lithium transition metal oxide was synthesized in the same manner as in EXAMPLE 1, except that the tap density of the transition metal precursor was changed to 2.0 g/cm³, and that the calcination temperature was changed to 950° C. The lithium transition metal oxide had a void content in secondary particles of 20%, an average particle size of primary particles of 0.3 μm, a crystallite size of 100 nm, a crystal distortion of 0.15%, and a compressive fracture strength of secondary particles of 88 MPa. The pore size diameter distribution of the secondary particles of the lithium transition metal oxide had a peak at 0.2 μm on the distribution curve.

A nonaqueous electrolyte secondary battery was fabricated in the same manner as in EXAMPLE 1, except that the above lithium transition metal oxide was used as the positive electrode active material of COMPARATIVE EXAMPLE 2.

[Output Test]

At 25° C., the nonaqueous electrolyte secondary batteries of EXAMPLES 1 to 3 and COMPARATIVE EXAMPLES 1 and 2 were charged at a constant current of 800 mA, 0.4 It rate, to 4.1 V, and were charged at a constant voltage of 4.1 V. The batteries were then discharged at a constant current of 800 mA to 2.5 V. The discharge capacities were obtained as the rated capacities of the nonaqueous electrolyte secondary batteries of EXAMPLES 1 to 3 and COMPARATIVE EXAMPLES 1 and 2.

Next, the nonaqueous electrolyte secondary batteries of EXAMPLES 1 to 3 and COMPARATIVE EXAMPLES 1 and 2 were charged to 50% rated capacity. At a battery temperature of 25° C., the maximum current at which the battery could be discharged to a discharge cutoff voltage of 2 V in 10 seconds was measured. The output at 50% state of charge (SOC) was determined using the following equation.

Output (50% SOC)=(Maximum current)×(Discharge cutoff voltage (2.0 V))

[Charge Discharge Cycle Test]

At 25° C., the nonaqueous electrolyte secondary batteries of EXAMPLES 1 to 3 and COMPARATIVE EXAMPLES 1 and 2 were charged at a constant current of 2000 mA, 1 It rate, to 4.1 V, and were charged at a constant voltage of 4.1 V. The batteries were then discharged at a constant current of 2000 mA to 2.5 V. This charge discharge cycle was repeated 500 times. The capacity retention was calculated using the following equation.

Capacity retention (%)=Discharge capacity in 500th cycle/Discharge capacity in 1st cycle×100

Table 1 describes the void contents in secondary particles, the average particle sizes of primary particles, the crystallite sizes, the crystal distortions, and the compressive fracture strengths of secondary particles of the lithium transition metal oxides in EXAMPLES 1 to 3 and COMPARATIVE EXAMPLES 1 and 2, and the outputs and the capacity retentions of the nonaqueous electrolyte secondary batteries of EXAMPLES 1 to 3 and COMPARATIVE EXAMPLES 1 and 2.

TABLE 1

| | Void content in secondary particles % | Average particle size of primary particles μm | Crystallite size nm | Crystal distortion % | Compressive fracture strength MPa | Output W | Capacity retention % |
|---|---|---|---|---|---|---|---|
| EX. 1 | 32 | 2 | 280 | 0.13 | 350 | 88 | 95 |
| EX. 2 | 40 | 1.8 | 250 | 0.12 | 300 | 90 | 94 |
| EX. 3 | 50 | 1.5 | 200 | 0.11 | 250 | 90 | 93 |
| COMP. EX. 1 | 5 | 0.5 | 180 | 0.2 | 120 | 60 | 85 |
| COMP. EX. 2 | 20 | 0.3 | 100 | 0.15 | 88 | 80 | 80 |

The nonaqueous electrolyte secondary batteries of EXAMPLES 1 to 3 which involved, as the positive electrode active material, the lithium transition metal oxide having an average particle size of primary particles of not less than 1 μm and a void content in secondary particles of more than 30% attained a high output and a high capacity retention after 500 cycles of charging and discharging, as compared to the nonaqueous electrolyte secondary batteries of COMPARATIVE EXAMPLES 1 and 2 in which the positive electrode active material failed to satisfy the above characteristics. In EXAMPLES 1 to 3, a higher output was achieved by the nonaqueous electrolyte secondary batteries of EXAMPLES 2 and 3 in which the lithium transition metal oxide as the positive electrode active material had an average particle size of primary particles of not less than 1 μm and a void content in secondary particles of not less than 40%.

REFERENCE SIGNS LIST

10 NONAQUEOUS ELECTROLYTE SECONDARY BATTERY
11 EXTERIOR CASE
12 SEALING PLATE
13 POSITIVE ELECTRODE EXTERNAL TERMINAL
14 NEGATIVE ELECTRODE EXTERNAL TERMINAL
15 GAS VENT VALVE
16 INJECTION SECTION
30 SECONDARY PARTICLE
31 PRIMARY PARTICLE
32 VOID
33 LONG VOID

The invention claimed is:

1. A positive electrode active material for nonaqueous electrolyte secondary batteries, comprising secondary particles of lithium transition metal oxide comprising aggregates of primary particles of the oxide,
   the primary particles having an average particle size of not less than 1 μm, the secondary particles having a void content of more than 30%,
   wherein the positive electrode active material includes a long void that is continuous from a surface of the secondary particle over a length of more than ⅙ of a particle diameter, and a proportion of the long voids relative to voids within the secondary particles is not less than 50%.

2. The positive electrode active material for nonaqueous electrolyte secondary batteries according to claim 1, wherein the pore size diameter distribution of the secondary particles has a peak in the range of 0.3 to 1.0 μm on a distribution curve.

3. The positive electrode active material for nonaqueous electrolyte secondary batteries according to claim 1, wherein the compressive fracture strength of the secondary particles is in the range of 200 to 500 MPa.

4. The positive electrode active material for nonaqueous electrolyte secondary batteries according to claim 1, wherein the crystallite size of the lithium transition metal oxide is not less than 200 nm and the crystal distortion of the lithium transition metal oxide is less than 0.2%.

5. A nonaqueous electrolyte secondary battery comprising a positive electrode, a negative electrode and a nonaqueous electrolyte,
   the positive electrode comprising the positive electrode active material for nonaqueous electrolyte secondary batteries described in claim 1.

6. The positive electrode active material for nonaqueous electrolyte secondary batteries according to claim 1, wherein a ratio of longer diameter to shorter diameter (longer diameter/shorter diameter) of 50% or more of the primary particles forming the secondary particles is 2 or more.

* * * * *